US012116003B2

(12) United States Patent
Gray et al.

(10) Patent No.: US 12,116,003 B2
(45) Date of Patent: Oct. 15, 2024

(54) VEHICLE NOTIFICATION SYSTEM

(71) Applicant: NISSAN NORTH AMERICA, INC., Franklin, TN (US)

(72) Inventors: Erik St. Gray, San Jose, CA (US); Stefan Witwicki, San Carlos, CA (US)

(73) Assignee: Nissan North America, Inc., Franklin, TN (US)

( * ) Notice: Subject to any disclaimer, the term of this patent is extended or adjusted under 35 U.S.C. 154(b) by 34 days.

(21) Appl. No.: 17/855,669

(22) Filed: Jun. 30, 2022

(65) Prior Publication Data
US 2024/0001951 A1      Jan. 4, 2024

(51) Int. Cl.
| | |
|---|---|
| *B60W 50/14* | (2020.01) |
| *B60K 35/00* | (2006.01) |
| *B60W 40/08* | (2012.01) |
| *G06V 20/59* | (2022.01) |
| *G06V 40/20* | (2022.01) |
| *H04W 4/44* | (2018.01) |
| *B60K 35/28* | (2024.01) |

(Continued)

(52) U.S. Cl.
CPC ............ *B60W 50/14* (2013.01); *B60K 35/00* (2013.01); *B60W 40/08* (2013.01); *G06V 20/597* (2022.01); *G06V 40/20* (2022.01); *H04W 4/44* (2018.02); *B60K 35/28* (2024.01); *B60K 35/29* (2024.01); *B60K 35/85* (2024.01); *B60K 2360/166* (2024.01); *B60K 2360/178* (2024.01); *B60K 2360/1868* (2024.01); *B60K 2360/589* (2024.01); *B60W 2050/146* (2013.01); *B60W 2420/403* (2013.01); *B60W 2420/54* (2013.01); *B60W 2556/50* (2020.02)

(58) Field of Classification Search
CPC .. B60W 50/14; B60W 40/08; B60W 2556/60; B60W 2050/146; B60W 2420/42; B60W 2420/54; H04W 4/44; B60K 35/00; B60K 2370/589; B60K 2370/166; B60K 2370/178; B60K 2370/193; B60K 2370/1868; G06V 20/597; G06V 40/20
USPC ........................................................ 340/435
See application file for complete search history.

(56) References Cited

U.S. PATENT DOCUMENTS

| | | | |
|---|---|---|---|
| 8,698,639 B2 * | 4/2014 | Fung .................... | B60W 10/30 340/576 |
| 10,654,476 B2 | 5/2020 | Wray et al. | |

(Continued)

*Primary Examiner* — Zhen Y Wu
(74) *Attorney, Agent, or Firm* — Global IP Counselors, LLP (57) ABSTRACT

A vehicle includes an on-board satellite navigation device, a telematics control unit, a non-transitory computer readable medium, an electronic display device, and a processor. The on-board satellite navigation device is in communication with a global positioning system unit to acquire real-time information regarding conditions near the vehicle's vicinity. The telematics control unit is in wireless communications to at least one of a cloud services and a vehicle network to upload and receive crowdsourced information regarding conditions near the vehicle's vicinity. The non-transitory computer readable medium stores predetermined information regarding conditions near the vehicle vicinity. The processor is programmed to control the electronic display device to display notification data regarding the vehicle vicinity based on one or more of the real-time information, the crowdsourced information and the predetermined information.

18 Claims, 10 Drawing Sheets

SCENARIO A: STOP INTERSECTION (51) Int. Cl.
*B60K 35/29* (2024.01)
*B60K 35/85* (2024.01)

(56) References Cited

U.S. PATENT DOCUMENTS

| | | | |
|---|---|---|---|
| 11,084,504 B2 | 8/2021 | Wray et al. | |
| 11,093,767 B1* | 8/2021 | Argenti | B60W 50/14 |
| 11,113,973 B2 | 9/2021 | Wray et al. | |
| 11,623,653 B2* | 4/2023 | Liu | B60W 50/14 |
| | | | 701/22 |
| 11,679,779 B2* | 6/2023 | Sato | B60W 50/14 |
| | | | 340/435 |
| 2007/0182529 A1* | 8/2007 | Dobler | B60W 40/08 |
| | | | 340/438 |
| 2013/0342337 A1* | 12/2013 | Kiefer | B60W 50/16 |
| | | | 340/438 |
| 2015/0243168 A1* | 8/2015 | Roelle | B60W 50/14 |
| | | | 340/995.27 |
| 2018/0326999 A1* | 11/2018 | Hershkovitz | G06V 40/20 |
| 2019/0092337 A1* | 3/2019 | Chua | B60W 30/14 |
| 2019/0329771 A1* | 10/2019 | Wray | B60W 30/18154 |
| 2020/0097003 A1 | 3/2020 | Wray et al. | |
| 2020/0098269 A1 | 3/2020 | Wray et al. | |
| 2020/0128373 A1* | 4/2020 | Stevens | B60K 35/80 |
| 2020/0160714 A1* | 5/2020 | Inaba | B60K 35/10 |
| 2020/0269875 A1 | 8/2020 | Wray et al. | |
| 2020/0331491 A1 | 10/2020 | Wray et al. | |
| 2021/0157314 A1 | 5/2021 | Wray et al. | |
| 2021/0157315 A1 | 5/2021 | Wray et al. | |
| 2021/0188297 A1 | 6/2021 | Wray et al. | |
| 2021/0200208 A1 | 7/2021 | Wray et al. | |
| 2021/0237759 A1 | 8/2021 | Wray et al. | |
| 2021/0240190 A1 | 8/2021 | Wray et al. | |
| 2022/0126878 A1* | 4/2022 | Moustafa | G08G 1/096741 |
| 2022/0266851 A1* | 8/2022 | Sato | B60W 40/08 |

* cited by examiner

FIG. 5
SCENARIO A: STOP INTERSECTION

VEHICLE NOTIFICATION SYSTEM

BACKGROUND

Technical Field

The present disclosure generally relates to a vehicle notification system. More specifically, the present disclosure relates to a vehicle notification system configured to display notification data to a driver during vehicle use.

Background Information

A vehicle may traverse a portion of a vehicle transportation network (e.g., a road). Traversing the portion of the vehicle transportation network may include generating or capturing, such as by a sensor of the vehicle, data, such as data representing an operational environment, or a portion thereof, of the vehicle.

SUMMARY

In view of the state of the known technology, one aspect of the present disclosure is to provide a vehicle comprising an on-board satellite navigation device, a telematics control unit, a non-transitory computer readable medium, an electronic display device, and a processor. The on-board satellite navigation device is in communication with a global positioning system unit to acquire real-time information regarding conditions near the vehicle's vicinity. The telematics control unit is in wireless communications to at least one of a cloud services and a vehicle network to upload and receive crowdsourced information regarding conditions near the vehicle's vicinity. The non-transitory computer readable medium stores predetermined information regarding conditions near the vehicle vicinity. The processor is programmed to control the electronic display device to display notification data regarding the vehicle vicinity based on one or more of the real-time information, the crowdsourced information and the predetermined information.

In view of the state of the known technology, another aspect of the present disclosure is to provide a method for displaying notification data to a driver of a vehicle. The method comprises acquiring real-time information regarding conditions near the vehicle's vicinity from an on-board satellite navigation device. The on-board satellite navigation device is in communication with a global positioning system unit. The method further comprises acquiring crowdsourced information regarding conditions near the vehicle's vicinity from a telematics control unit. The telematics control unit is in wireless communications with at least one of a cloud services and a vehicle network. The method further comprises acquiring predetermined information regarding conditions near the vehicle vicinity from a non-transitory computer readable medium. The method further comprises controlling a vehicle on-board electronic display to display notification data regarding the vehicle vicinity based on one or more of the real-time information, the crowdsourced information and the predetermined information.

In view of the state of the known technology, another aspect of the present disclosure is to provide a vehicle notification system. The vehicle notification system comprises an electronic display device, an electronic control unit and a processor. The electronic display device configured to be displayed in an interior compartment of the vehicle. The electronic control unit has a processor and a non-transitory computer readable medium storing predetermined information regarding conditions near the vehicle vicinity. The processor is programmed to control the electronic display device to display notification data regarding the vehicle vicinity based on the predetermined information that is stored in the non-transitory computer readable medium.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
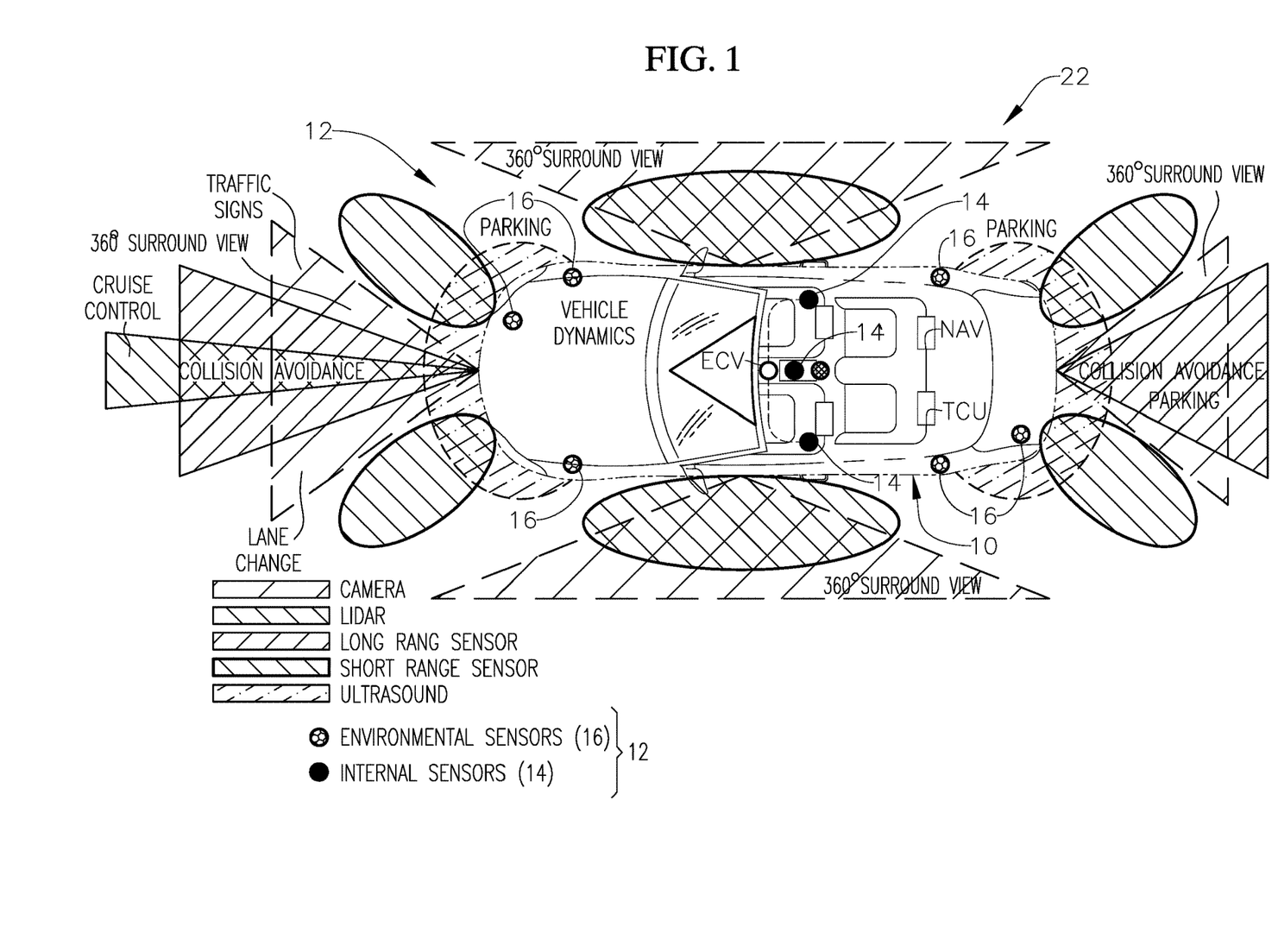
FIG. 1 is a top plan view of a vehicle equipped with a notification system that is schematically illustrated.
Figure 2:
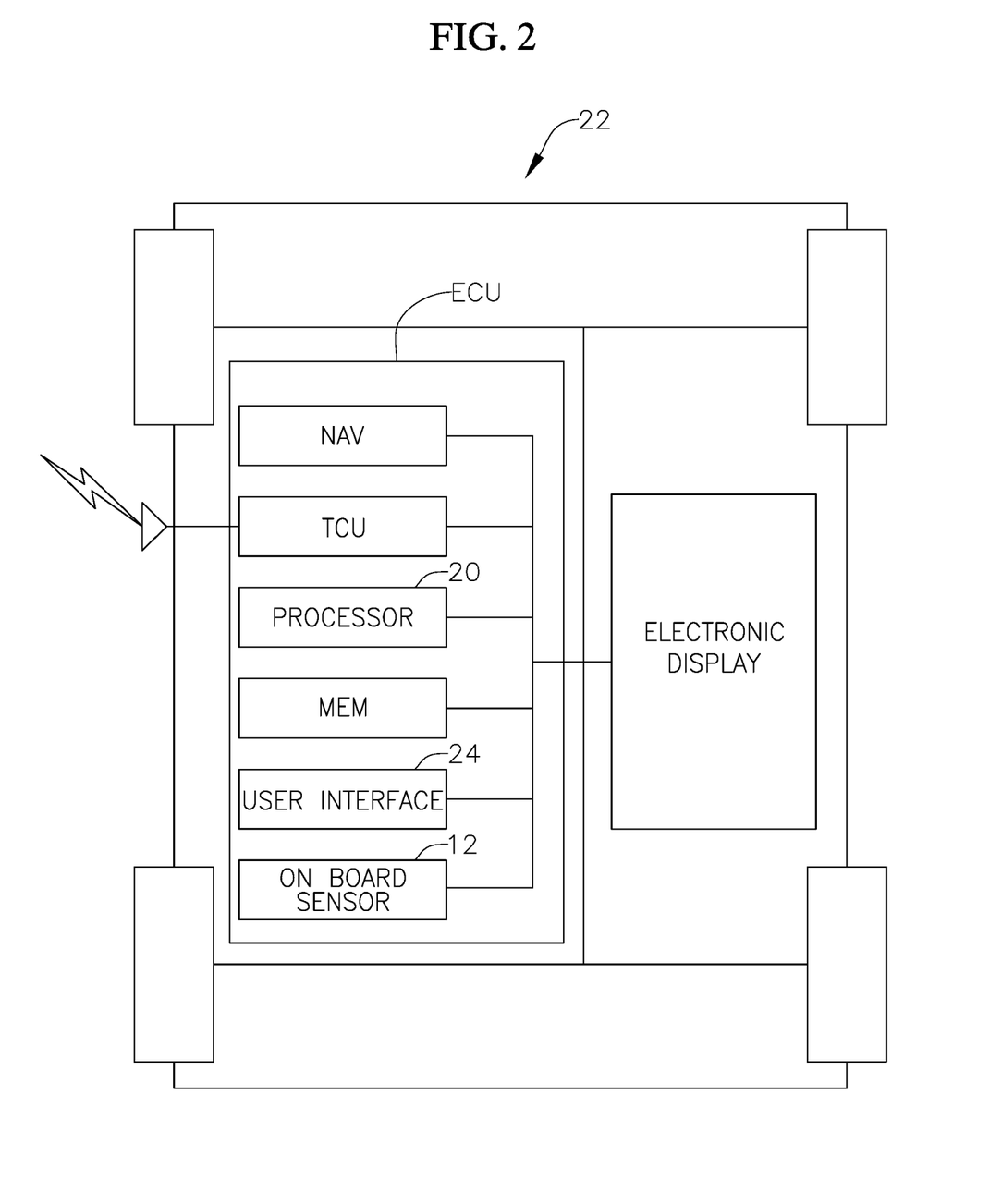
FIG. 2 is a schematic view of the components of the notification system.

Referring initially to FIG. 1, a vehicle 10 is schematically illustrated as being equipped with a plurality of control modules for navigation assistance. In the illustrated embodiment, the vehicle 10 is equipped with an on-board satellite navigation device NAV and a telematics control unit TCU, as best seen in FIGS. 1 and 2. The on-board satellite navigation device NAV and a telematics control unit TCU are considered examples of control modules for navigation assistance. The vehicle 10 is further equipped with an on-board sensor network 12 that monitors both internal and external conditions of the vehicle 10. That is, the on-board sensor network 12 includes internal sensors 14 to monitor conditions regarding the vehicle 10 interior, such as the vehicle's 10 passenger compartment. The on-board sensor network 12 further includes environmental sensors 16 that monitors conditions regarding the vehicle's 10 vicinity, as will be further discussed below.

For example, the vehicle 10 can be equipped with one or more unidirectional or omnidirectional external cameras that take moving or still images of the vehicle surroundings. In addition, the external cameras can be capable of detecting the speed, direction, yaw, acceleration and distance of the vehicle 10 relative to a remote object. The environmental sensors 16 can also include infrared detectors, ultrasonic detectors, radar detectors, photoelectric detectors, magnetic detectors, acceleration detectors, acoustic/sonic detectors, gyroscopes, lasers or any combination thereof. The environmental sensors 16 can also include object-locating sensing devices including range detectors, such as FM-CW (Frequency Modulated Continuous Wave) radars, pulse and FSK (Frequency Shift Keying) radars, sonar and Lidar (Light Detection and ranging) devices. The data from the environmental sensors 16 can be used to determine information about the vehicle's 10 vicinity, as will be further described below.

Preferably, the internal sensors 14 includes at least one internal unidirectional or omnidirectional camera positioned to detect behavior of one or more passengers in the passenger compartment. The on-board sensor network 12 further includes at least one internal microphone positioned to detect behavior of one or more passengers in the passenger compartment. The internal sensors 14 are provided to detect the behavior of the vehicle's 10 driver and/or passenger(s). For example, the internal sensors 14 can detect a state of whether the driver is distracted, unfocused or unresponsive. Cameras and microphones can detect whether the driver is engaged with a conversation with another passenger and is not paying attention to the navigation system or road conditions.

As shown in FIGS. 5 to 9, the vehicle 10 is further equipped with an electronic display device 18 configured to display notification data to the driver. The electronic display device 18 is positioned an interior compartment of the vehicle 10. The vehicle 10 is further equipped with an electronic control unit ECU controlling the electronic display device 18 to display notification data based on information received by the on-board sensor network 12, as will be further described. In particular, the ECU includes a processor 20 for controlling the operation of a notification system 22 of the vehicle 10, as will be further described. In the illustrated embodiment, the display device 18 is provided as part of the notification system 22 for the vehicle 10.

In the illustrated embodiment, "notification data" can include warnings, alerts, recommended maneuvers, road information, etc. In the illustrated embodiment, the processor 20 is programmed to control the electronic display device 18 to display the notification data. In particular, the processor 20 is programmed to control the electronic display device 18 to display notification data regarding the condition of the vehicle's 10 vicinity based on one or more of the real-time information, the crowdsourced information and the predetermined information, as will be further described below.

In the illustrated embodiment, the term "vehicle's vicinity" refers to an area within a two hundred meter distance to a one mile distance of the vehicle 10 from all directions. "Vehicle vicinity" includes an area that is upcoming on the vehicle's 10 navigation course.

Referring again to FIGS. 1 and 2, the vehicle's 10 control modules for navigation assistance will now be further discussed. In particular, the on-board satellite navigation device NAV is in communication with a global positioning system unit (GPS) to acquire real-time information regarding conditions near the vehicle's 10 vicinity. The on-board satellite navigation device NAV can be a global navigation satellite system (GNSS) receiver or GPS receiver that is capable of receiving information from GNSS satellites then calculate the device's geographical position. Therefore, the on-board satellite navigation device NAV acquires GPS information for the vehicle 10.

Figure 3:
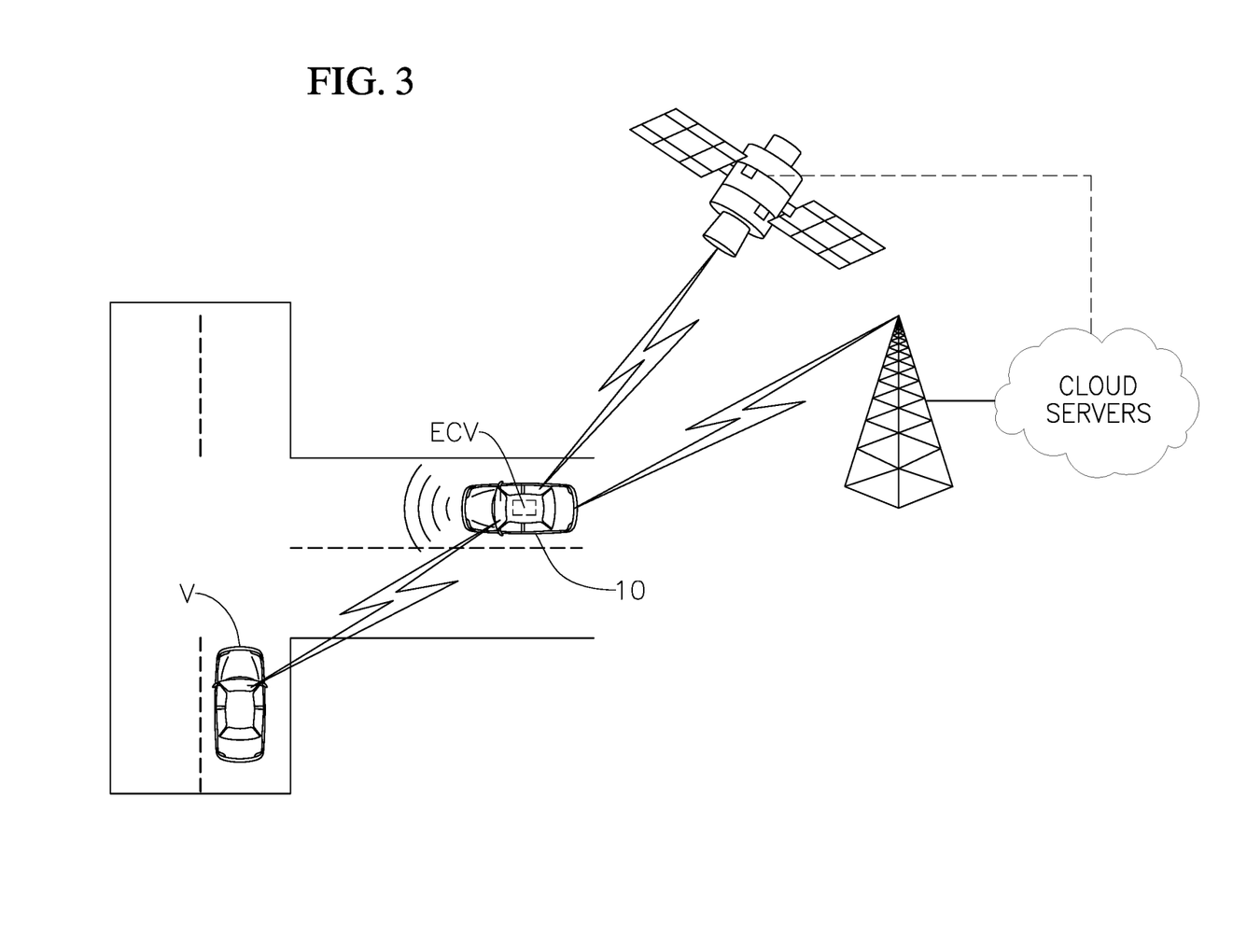
FIG. 3 is a schematic view of the vehicle as being in communication with a GPS server, a cloud server and a vehicle network.

As shown in FIG. 3, the on-board satellite navigation device NAV can also be in communication with a Wide Area Augmentation System (WAAS) enabled National Marine-Electronics Association (NMEA) unit, a radio triangulation unit, or a combination thereof. The on-board satellite navigation device NAV can obtain information that represents, for example, a current heading of the vehicle 10, a current position of the vehicle 10 in two or three dimensions, a current angular orientation of the vehicle 10, or a combination thereof. In this way, the on-board satellite navigation device NAV captures real-time information regarding conditions regarding the vehicle's 10 vicinity.

As seen in FIG. 3, 3he telematics control unit TCU is in wireless communications to at least one of a cloud server and a vehicle network to upload and receive crowdsourced information regarding conditions near the vehicle's 10 vicinity. The TCU receives the crowdsourced information which are preferably automatically stored into the non-transitory computer readable medium MEM, as will be further described. Data from on-board electronic control unit ECUs, the on-board sensors can also be transmitted by the TCU to the cloud server or to the vehicle network. That is, the vehicle's 10 location, method of traversal and own experience on a navigation path can also be transmitted to the cloud server or the cloud network.

The TCU is an embedded computer system that wirelessly connects the vehicle to cloud services or other the vehicle network via vehicle 10-to-everything (V2X standards) over a cellular network. The TCU collects telemetry data regarding the vehicle such as position, speed, engine data, connectivity quality etc. by interfacing with various sub-systems and control busses in the vehicle 10. The TCU can also provide in-vehicle 10 connectivity via Wi-Fi and Bluetooth. The TCU can include an electronic processing unit, a microcontroller, a microprocessor 20 or field programmable gate array (FPGA), which processes information and serves to interface with the GPS unit. The TCU can further include a mobile communication unit and memory for saving GPS values in case of mobile-free zones or to intelligently store information about the vehicle 10's sensor data. Therefore, the memory that stores the information from the TCU can either be part of the TCU or the vehicle's 10 on-board ECU.

Using the TCU, the vehicle 10 can communicate with one or more other vehicle 10 (e.g., the vehicle network), as seen in FIG. 3. For example, the TCU is capable of receiving one or more automated inter-vehicle 10 messages, such as a basic safety message (BSM), from a remote vehicle 10 V via a network communicated using the TCU. Alternatively, the TCU can receive messages via a third party, such as a signal repeater (not shown) or another remote vehicle 10 (not shown). The TCU can receive one or more automated inter-vehicle 10 messages periodically, based on, for example, a defined interval, such as 100 milliseconds.

Automated inter-vehicle messages received and/or transmitted by the TCU can include vehicle identification information, geospatial state information (e.g., longitude, latitude, or elevation information, geospatial location accuracy information), kinematic state information (e.g., vehicle acceleration information, yaw rate information, speed information, vehicle heading information, braking system status information, throttle information, steering wheel angle information), vehicle routing information, vehicle operating state information (e.g., vehicle size information, headlight state information, turn signal information, wiper status information, transmission information) or any other information, or combination of information, relevant to the transmitting vehicle state. For example, transmission state information may indicate whether the transmission of the transmitting vehicle 10 is in a neutral state, a parked state, a forward state, or a reverse state.

The TCU can also communicate with the vehicle network via an access point. The access point can be a base station, a base transceiver station (BTS), a Node-B, an enhanced Node-B (eNode-B), a Home Node-B (HNode-B), a wireless router, a wired router, a hub, a relay, a switch, or any similar wired or wireless device. The vehicle 10 can communicate with the vehicle network via the NAV or the TCU. In other words, the TCU can be in communication via any wireless communication network such as high bandwidth GPRS/1XRTT channel, a wide area network (WAN) or local area network (LAN), or any cloud-based communication, for example. Therefore, using the TCU, the vehicle 10 can participate in a computing network or a cloud-based platform.

The cloud server and/or the vehicle network can provide the vehicle 10 with information that is crowdsourced from drivers, pedestrians, residents and others. For example, the cloud server and/or the vehicle network can inform the vehicle 10 of a live concert with potential for large crowds and traffic congestion along the path on or near the vehicle's 10 travel route. The cloud server and/or the vehicle network can also inform the vehicle 10 of potential pedestrians along the path on or near the vehicle's 10 travel route such as children getting off from school based on school location with respect to the vehicle's 10 navigation path and the current time. The cloud server and/or the vehicle network can also inform the vehicle 10 of conditions of general oncoming traffic, oncoming signs and lights, incoming lanes, restricted lanes, road closures, construction sites, potential vehicle 10 encounters, accidents, and potential pedestrian encounters, etc.

Figure 8:
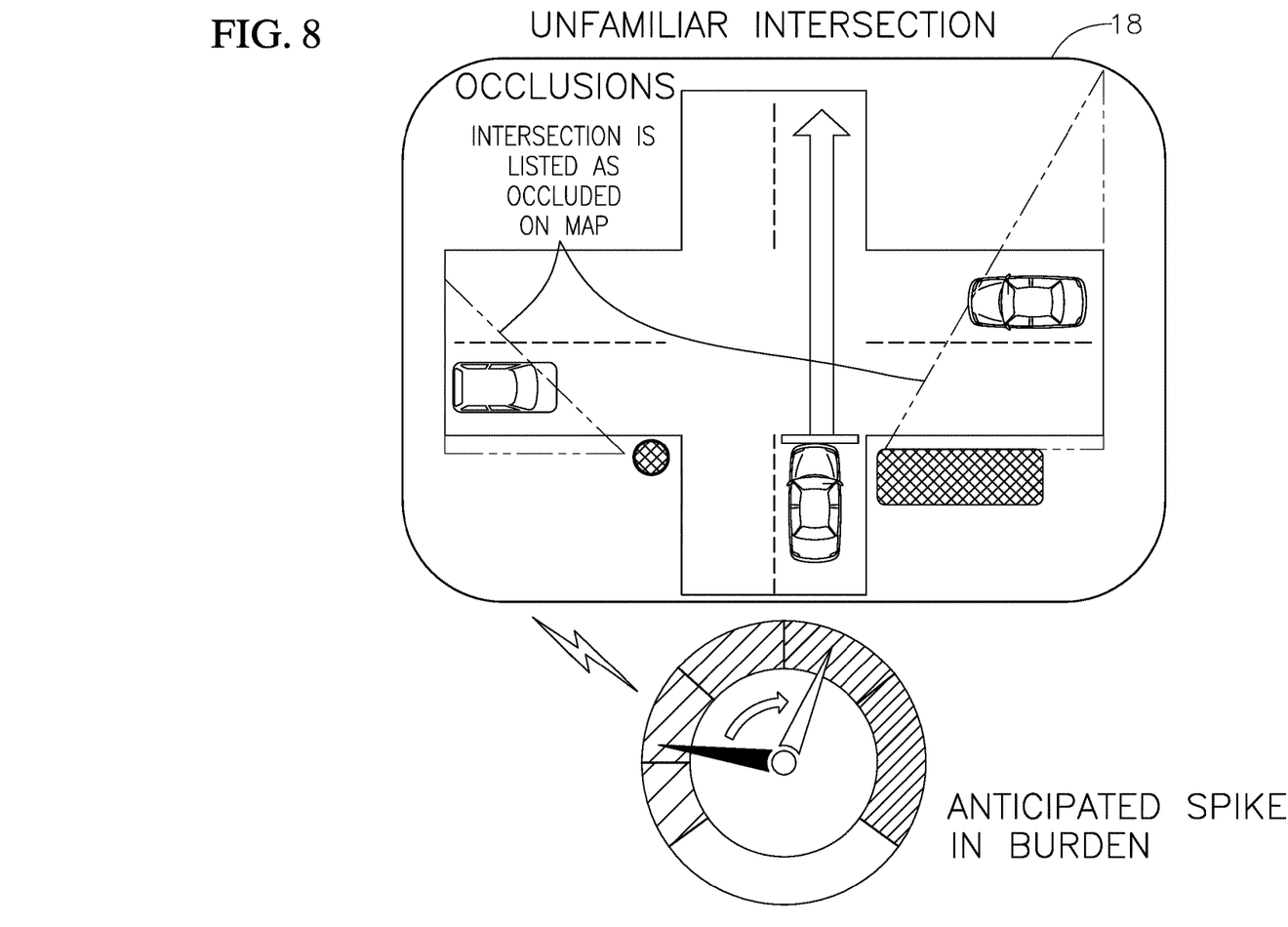
FIG. 8 is a schematic view of a fourth example of notification data that can be displayed by the display device of the notification system.

The crowdsourced information obtained from the cloud server and/or the vehicle network can also include intersection geometry tags for locations pre-identified or computed to be difficult or poor visibility at junctions (based on geometric calculations, or crowdsourced data from other vehicle 10s). This type of information can be displayed as notification data on the display device 18 as shown in FIG. 8.

Figure 5:
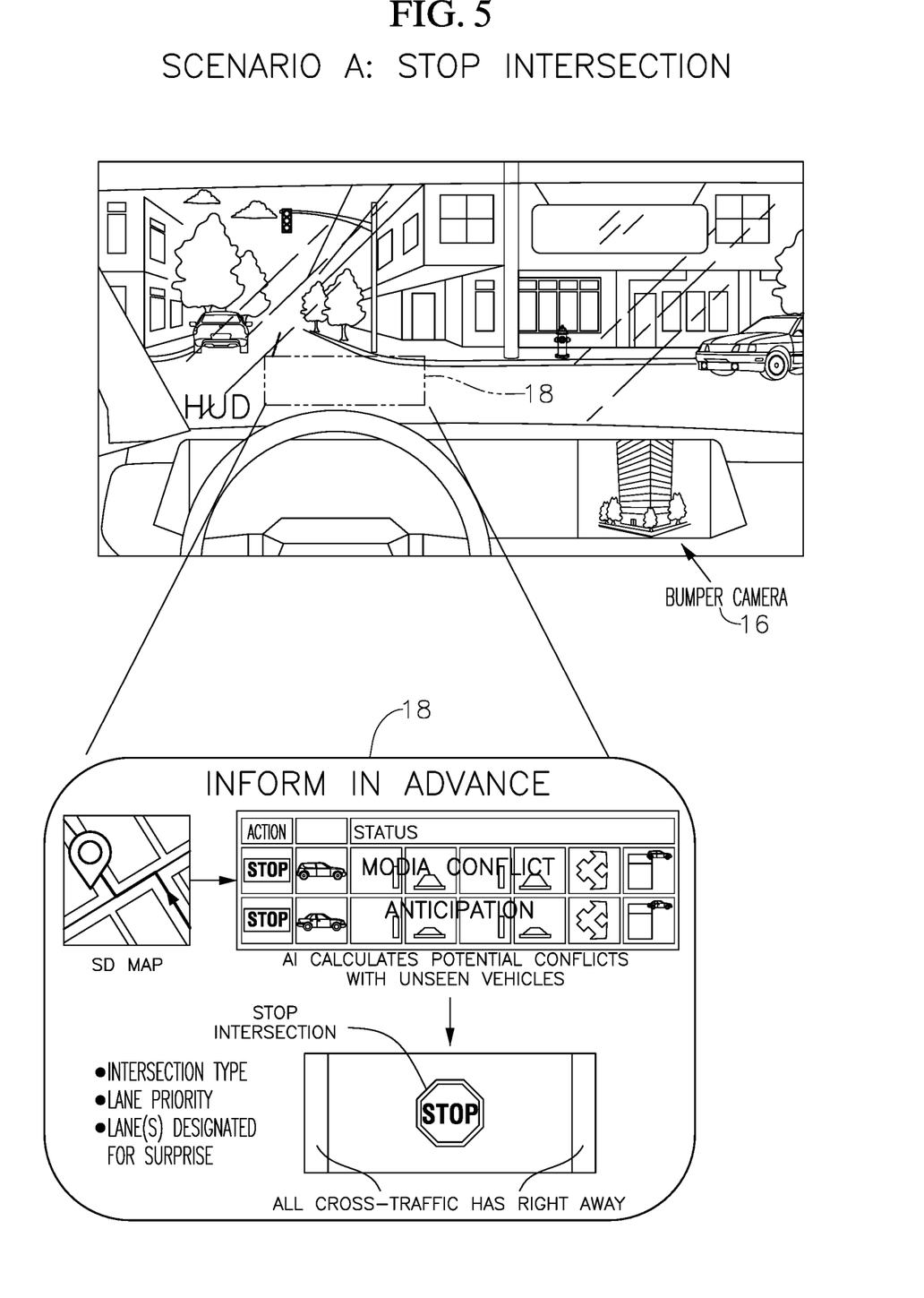
FIG. 5 is a schematic view of a first example of notification data that can be displayed by a display device of the notification system.

The TCU can also inform the vehicle 10 of information received from a transportation network and/or a pedestrian network to receive information about pedestrian navigable area, such as a pedestrian walkway or a sidewalk, may correspond with a non-navigable area of a vehicle 10 transportation network. This type of information can be displayed as notification data on the device as shown in FIG. 5.

The vehicle network can include the one or more transportation networks that provides information regarding unnavigable areas, such as a building, one or more partially navigable areas, such as parking area, one or more navigable areas, such as roads, or a combination thereof. The vehicle 10 transportation network may include one or more interchanges between one or more navigable, or partially navigable, areas.

As stated, the vehicle 10 further comprises the on-board electronic control unit ECU, best illustrated in FIG. 2. The vehicle 10 can include more than one on-board ECUs for controlling different systems of the vehicle 10, although one is illustrated and described for simplicity. The ECU has a non-transitory computer readable medium MEM. The ECU further includes a processor 20 with microprocessor programmed to perform control functions that will be further discussed below. The non-transitory computer medium preferably stores information such as navigation maps or road condition maps on the vehicle 10 for at least a period of time.

This information can be downloaded from the cloud server and/or the vehicle network server monthly, weekly, daily, or even multiple times in a drive, but would need to be stored locally for processing by the driver support system. Therefore, the non-transitory computer readable medium MEM preferably stores regularly updated maps with information about activities that can be encountered by the vehicle 10, such as neighborhood information. The non-transitory computer medium preferably stores information that are downloaded from the cloud server and/or the vehicle network. This information is in conjunction with the real-time information acquired by the NAV (e.g., the GPS data). The processor 20 controls automatic download of information from the cloud server and/or the vehicle network at regular intervals.

In the illustrated embodiment, the non-transitory computer readable medium MEM stores predetermined information regarding conditions near the vehicle's 10 vicinity. In particular, the non-transitory computer readable medium MEM stores predetermined threshold information for displaying notification data to the user, as will be further described below. The predetermined information can also include a database of road or navigation conditions, as will be further described below. The processor 20 controls the display device 18 to display notification information based on information acquired by all the systems and components described above.

Referring now to FIGS. 5 to 9, the electronic display is provided in the vehicle 10 interior. The display device 18 is in connection with the ECU to receive control information from the ECU. The display device 18 can include a single type display, or multiple display types (e.g., both audio and visual) configured for human-machine interaction. The display device 18 include any type of display panel as desired to display notification data, navigation data and other information.

Therefore, the display device 18 can be one or more dashboard panels configured to display lights, text, images or icons. Alternatively, the display device 18 can include a heads-up display (for example shown in FIG. 5). Thus, the display device 18 can be directly mounted onto the vehicle 10 body structure, or mounted onto the windows panels. The display device 18 can alternatively be provided on a mobile device that is synced with the ECU of the vehicle 10. The display device 18 can have different shapes and sizes to accommodate the shape and contours of the vehicle 10.

Figure 4:
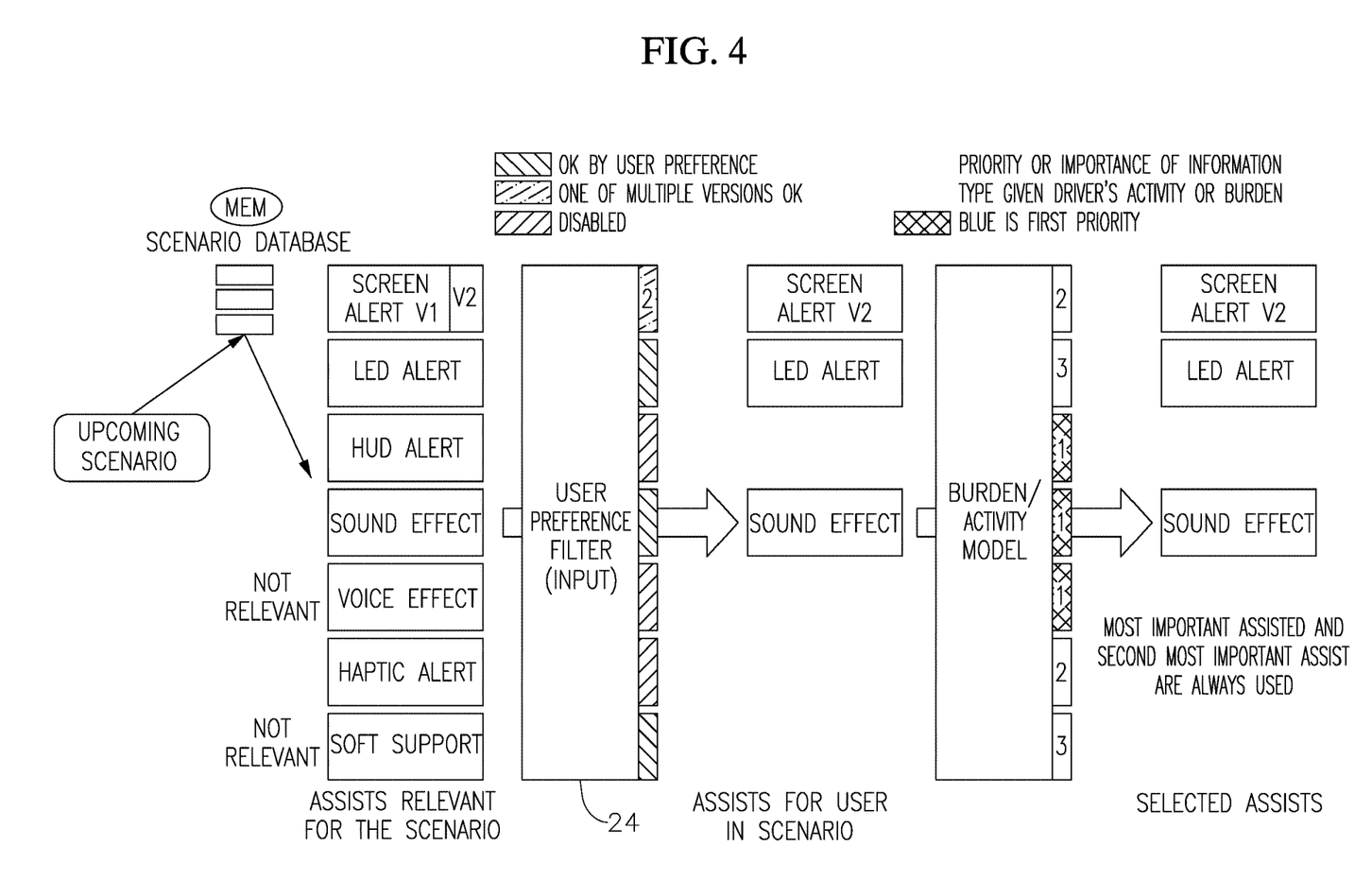
FIG. 4 is a schematic view of the operations of the notification system.

As best seen in FIGS. 2 and 4, the display device 18 further includes a set of user input interfaces 24 to communicate with the driver. The display device 18 is configured to receive user inputs from the vehicle occupants. The display device 18 can include, for example, control buttons and/or control buttons displayed on a touchscreen display (e.g., hard buttons and/or soft buttons) which enable the user to enter commands and information for use by the ECU to control various aspects of the vehicle 10. For example, input interface 24 provided to the display device 18 can be used by the ECU to monitor the climate in the vehicle 10, interact with the navigation system, control media playback, or the like. The display device 18 can also include a microphone that enables the user to enter commands or other information vocally. The display device 18 can further include one or more speakers that provide sound alerts and sound effects including computer-generated speech.

As stated, the display device 18 as part of the vehicle notification system 22, as illustrated in FIGS. 1 and 2. In the illustrated embodiment, the notification system 22 comprises the electronic display device 18 configured to be displayed in an interior compartment of the vehicle 10. The notification system 22 further includes the electronic control unit ECU having the processor 20 and the non-transitory computer readable medium MEM storing predetermined information regarding conditions near the vehicle's 10 vicinity. With the notification system 22, the processor 20 is programmed to control the electronic display device 18 to display notification data regarding the vehicle's 10 vicinity based on the predetermined information that is stored in the non-transitory computer readable medium MEM.

The notification system 22 further comprises the vehicle 10 having the NAV that acquires information from the GPS unit and the TCU acquiring information from the cloud server and the vehicle network. In the illustrated embodiment, the processor 20 is programmed to automatically download information from the cloud services and the vehicle network to be stored in the non-transitory computer readable medium MEM (daily, weekly, upon vehicle 10 ignition turning ON). This allows for the technical improvement of the vehicle 10 having the notification system 22 to not need to be connected to the cloud server or the vehicle network in real-time in order to be able to display information based on information received from the cloud server or the vehicle network.

The user can input preferences for the notification system 22 into the input interface 24s. For example, the user can activate/deactivate the notification system 22 using the input interface 24s. The user can also select between versions or modes of the notification system 22 such as selecting icon preferences (e.g., size or location), display preferences (e.g., frequency of display, map based, icon based, etc.), sound OFF or sound only.

The notification system 22 is provided to help inform drivers of oncoming road conditions and conditions regarding the vehicle's 10 vicinity in order to help the driver make better driving decisions. Preferably, the notification system 22 of the illustrated embodiment enables the display device 18 to display information that is predictive of upcoming driving conditions. By utilizing information received by the TCU and NAV on a continuous basis, while also downloading conditions onto the on-board computer readable medium MEM for at least a period of time, the notification system 22 of the vehicle 10 can be utilized as a low-cost application with limited need for continuous real-time sensing or detector use. This arrangement enables the technical improvement of allowing the on-board sensor network 12 to be utilized for a burden model of the notification system 22 to determine a burden state of the driver and/or passengers and control the display device 18 to display notification data accordingly.

In the illustrated embodiment, the notification system 22 is controlled by the processor 20. The processor 20 can include any device or combination of devices capable of manipulating or processing a signal or other information now-existing or hereafter developed, including optical processors, quantum processors, molecular processors, or a combination thereof. For example, the processor 20 can include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. As seen in FIG. 2, the processor 20 is operatively coupled with the computer readable medium MEM, the input interface 24, the sensor network 12, the TCU, the NAV and the display device 18.

As used herein, the terminology "processor 20" indicates one or more processors, such as one or more special purpose processors, one or more digital signal processors, one or more microprocessors, one or more controllers, one or more microcontrollers, one or more application processors, one or more Application Specific Integrated Circuits, one or more Application Specific Standard Products; one or more Field Programmable Gate Arrays, any other type or combination of integrated circuits, one or more state machines, or any combination thereof.

As used herein, the terminology "memory" or "computer-readable medium MEM" (also referred to as a processor-readable medium MEM) indicates any computer-usable or computer-readable medium MEM or device that can tangibly contain, store, communicate, or transport any signal or information that may be used by or in connection with any processor. For example, the computer readable medium MEM may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

Therefore, the computer-readable medium MEM further includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media can include, for example, optical or magnetic disks and other persistent memory. Volatile media may include, for example, dynamic random access memory (DRAM), which typically constitutes a main memory.

The computer readable medium MEM can also be provided in the form of one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof.

The processor 20 can executed instructions transmitted by one or more transmission media, including coaxial cables, copper wire and fiber optics, including the wires that comprise a system bus coupled to a processor of a computer. As used herein, the terminology "instructions" may include directions or expressions for performing any method, or any portion or portions thereof, disclosed herein, and may be realized in hardware, software, or any combination thereof.

For example, instructions may be implemented as information, such as a computer program, stored in memory that may be executed by the processor 20 to perform any of the respective methods, algorithms, aspects, or combinations thereof, as described herein. In some embodiments, instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

Computer-executable instructions can be compiled or interpreted from computer programs created using a variety of programming languages and/or technologies, including, without limitation, and either alone or in combination, Java™, C, C++, Visual Basic, Java Script, Perl, etc. In general, the processor 20 receives instructions from the computer-readable medium MEM and executes these instructions, thereby performing one or more processes, including one or more of the processes described herein. Such instructions and other data may be stored and transmitted using a variety of computer-readable media.

For example, the processor 20 can also use information from the environmental sensors 16 to identify, the type of road (e.g., type of lanes and lane segments, urban or highway), difficulty of traversal of lane(s) and lane segment(s), density of traffic, the level of the density, etc.

In the illustrated embodiment, the processor 20 is programmed to anticipate information regarding upcoming conditions near the vehicle's 10 vicinity based on one or more of the real-time information received from the on-board satellite navigation device NAV, the crowdsourced information and the predetermined information (stored in the computer readable medium MEM). The processor 20 is programmed to predict and anticipate oncoming road conditions within the vehicle's 10 vicinity based on the real-time information received from the on-board satellite navigation device NAV, the crowdsourced information and the predetermined information.

Preferably, the processor 20 can anticipate or predict oncoming road conditions by also calculating geometric arrangements of road conditions based on the real-time information, the crowdsourced information and the predetermined information, as will be described, as will be further described below. In this way, the processor 20 can determine occlusions and display them on the display device 18, such as shown in FIG. 8. Therefore, the display device 18 can display notification data including upcoming conditions near the vehicle's 10 vicinity that is anticipated by the processor 20.

As stated, the non-transitory computer readable medium MEM stores predetermined information. For example, the non-transitory computer readable medium MEM includes one or more database of road conditions or situations. The database can include a set of road feature parameters that can be applicable for almost all navigation paths along a road feature or intersection (e.g., intersection type, ongoing traffic control(s), lane types and numbers, lane angles, etc.). The database can optionally further include a set of path parameters (e.g., straight, left turn, right turn, U-turn, etc.) for the notification system 22. That is, the computer readable medium MEM stores a database of driving scenarios that can be compared with the real time driving scenario of the vehicle 10 in order to inform the notification system 22 of appropriate notification data to display on the display device 18.

Figure 6:
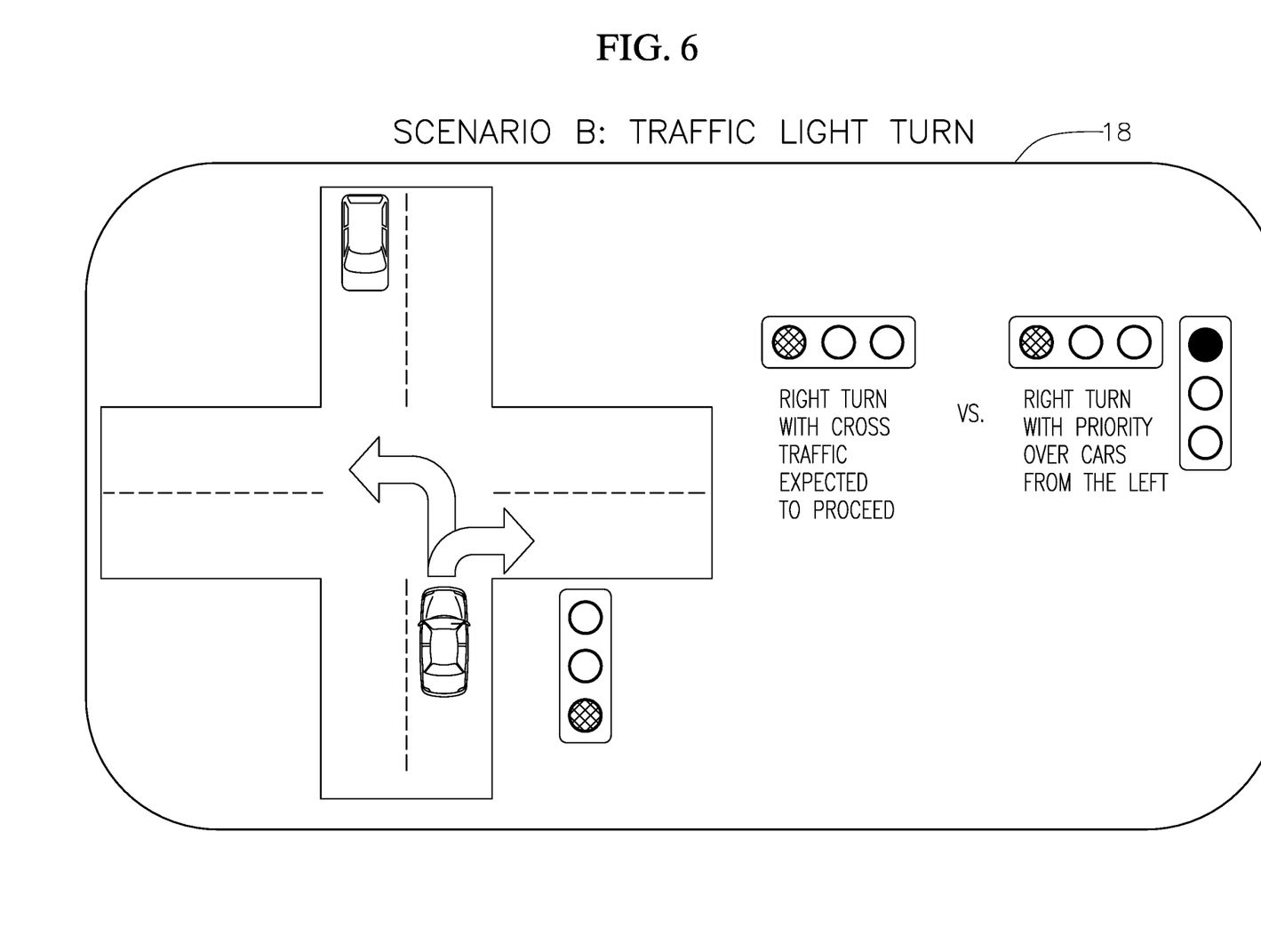
FIG. 6 is a schematic view of a second example of notification data that can be displayed by the display device of the notification system.

For example, if the driver intends to make a right turn at a red light, the notification system 22 can display notification data that a light is upcoming on the display device 18, as seen in FIG. 6. In addition, the notification can optionally display additional feedback about whether a right turn is legal or not legal at that intersection on the display device 18. The computer readable medium MEM can also include the situation of a left turn at an upcoming traffic light that is red. The display device 18 can inform the driver that a stop event is necessary due to the traffic light or due to another vehicle 10 having the right of way. Therefore, the display device 18 can display upcoming conditions including at least one of a vehicle stopping event, a vehicle deceleration event, a vehicle acceleration event and a lane change event.

In another example, if the driver is turning left at an upcoming T-junction where the driver is on the main road, the notification system 22 can notify the driver that oncoming traffic will not stop for them, also as shown in FIG. 6. The notification can be based on the information prestored in the computer readable medium MEM that can include crowdsourced information from the cloud services and the vehicle network, and be based on the real-time GPS information that is detecting where the driver is going.

In these examples, the processor 20 can determine the navigation path of the vehicle 10 based on information received from the NAV and the on-board sensor network 12 that monitors real-time vehicle 10 activity. The processor 20 is programmed to anticipate upcoming situations that can be encountered by the vehicle 10 based on the vehicle's 10 direction of travel, time, speed, etc. The processor 20 is further programmed to compare the upcoming situations that are anticipated with the database of situations that are stored in the computer readable medium MEM. When there is a match, the processor 20 controls the electronic display device 18 to display the appropriate notification.

The notification data that is displayed can include notification of an upcoming scenario type, and/or a predicted estimated time to arrival (ETA). In another example, if the driver is driving with the NAV OFF and the processor 20 cannot determine where the driver is going, the processor 20 can be programmed to assume that the driver will go straight as a default setting in the event that the processor 20 has not determined that the vehicle 10 is changing lanes. Alternatively, the processor 20 can determined certain vehicle maneuvers such as left or right turn, lane change, by detecting that the vehicle's 10 turn signal is ON, or by detecting a torque output or a steering wheel maneuver. In this instance, the processor 20 can control the display device 18 accordingly upon determining these vehicle maneuvers. Therefore, it will be apparent to those skilled in the vehicle field from this disclosure that the ECU can be connected to various control systems and control modules of the vehicle (such as the engine control module, etc.) to determine the vehicle condition, etc.

The display device 18 can display notification data for intersection type assistance. For example, the notification data displayed by the display device 18 can include an identification of the intersection type, as seen in FIG. 5, and also whether the intersection is traffic controlled. The notification data can also be displayed for intersection priority assistance at a multi-way stop. The display device 18 can provide notification as to whether another vehicle 10 has the right of way and which order to proceed towards the intersection.

The display device 18 can also notification data that provide options for maneuvers. For example, at a traffic light turn, the display device 18 can display options for what maneuvers are allowed and what maneuvers that are prohibited. The display device 18 can further display icons, graphics or instructions indicating crucial areas of interest to direct the driver's focus. For example, the display device 18 is a heads up display on the windshield, as seen in FIG. 5. Optionally, the display device 18 can display arrows pointing to areas of interest where the driver should pay attention (e.g., junctions at an acute or obtuse angle instead of at right angles, bicycle lanes, pedestrian lanes, etc.).

The display device 18 can also display notification data that provide notification data informing the driver oncoming short merges based on the GPS data, the vehicle's 10 navigation path and speed. The display device 18 can also display notification data that provide notification data informing the driver about restricted lanes (including bus lanes, sidewalks, trolley tracks) that might appear road-like. The display device 18 can also display notification data that provide notification data informing the driver about areas of restricted visibility that are upcoming and require special techniques. Therefore, the display device 18 can display notification data including upcoming occlusions in which the driver might not be able to see a road sign or a portion of a crosswalk, intersection, etc.

The display device 18 can also display notification data that provide notification data informing the driver about pinch points where road space is reduced to the point that negotiation with other vehicles may be necessary to proceed with more caution. The display device 18 can also display notification data that provide notification data informing the driver about upcoming mid-block pedestrian crossings.

Figure 7:
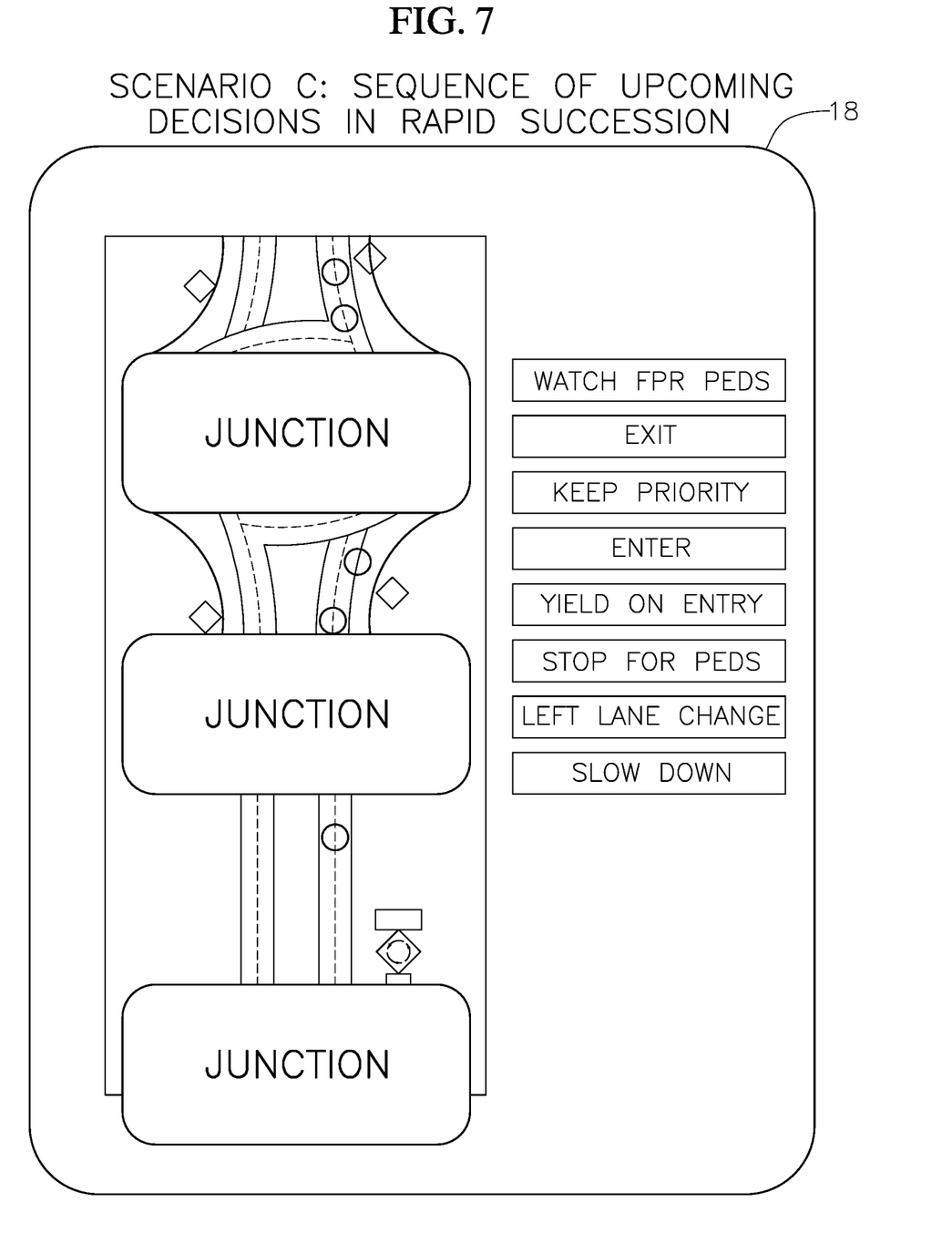
FIG. 7 is a schematic view of a third example of notification data that can be displayed by the display device of the notification system.

The display device 18 can also display notification data that provide notification informing the driver of rapid sequence of upcoming decisions in succession, as shown in FIG. 7. For example, the notification data can provide recommendations or alerts for an upcoming series of junctions that will occur in short succession. Therefore, the display device 18 can display upcoming conditions including a series of events occurring in succession. The series of events that can occur in succession includes at least a vehicle stopping event, a vehicle deceleration event, a vehicle acceleration event (vehicle needs to accelerate to make an exit) and a lane change event.

Figure 9:
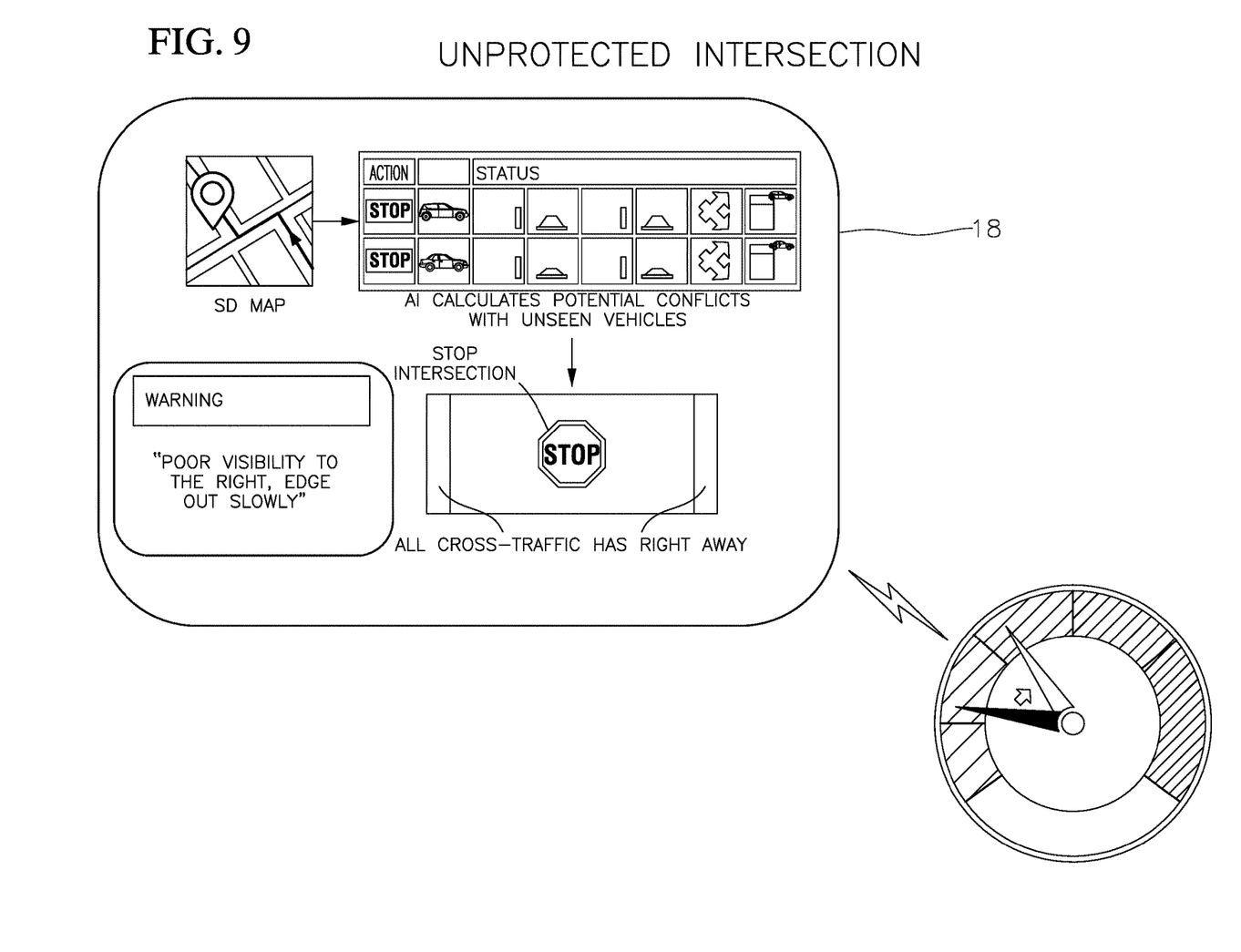
FIG. 9 is a schematic view of a fifth example of notification data that can be displayed by the display device of the notification system.

As seen in FIGS. 8 and 9, the notification system 22 can include a human burden model that determines a burden condition of the driver. The display device 18 can display notification data that accounts for the burden condition of the driver and/or any of the passengers. As previously stated, the internal sensors 14 (e.g., microphones and cameras) are positioned to detect behavior of one or more passengers in the passenger compartment (e.g., whether the driver is distracted, unfocused or unresponsive).

The internal sensors 14 can detect whether the driver is distracted by another task, such as holding a mobile device or talking to someone. The internal sensors 14 can detect whether the driver is focused or looking at the road ahead or whether they are focused on other subjects. The processor 20 can then assess whether the driver is likely to become overburdened based in information detected by the internal sensors 14, such as detecting that the driver is glancing up and down from a map or a mobile device, detecting audible signs of confusion, sporadic acceleration and braking, etc.

In the illustrated embodiment, the processor 20 can be programmed to determine or anticipate a situation in which the driver is likely to become burdened, the degree of the burden and/or the nature of the burden based on information detected by the internal sensors 14. The processor 20 can concurrently determine the current or upcoming road condition for the vehicle 10 and determine whether the display device 18 needs to display enhanced notification or alerts so to engage the driver's interest. Therefore, the processor 20 is programmed to determine a burden condition of the vehicle's 10 driver based on information received from the on-board sensor network 12.

The processor 20 can assess the degree or intensity of the burden condition of the driver based on one or more of the following factors or categories: center awareness, peripheral awareness, weighted visual awareness, aural awareness, touch awareness, soft support efficacy. The processor 20 can be programmed to give each of these factors a grade that can be a numerical value on a scale from zero (0) to ten (10), with zero being almost no burden and ten being very high burden. In situations of high burden (e.g., a burden grade of five to ten) the processor 20 can control the electronic display device 18 to increase the intensity of notification data that is displayed based on the conditions regarding the passenger compartment of the vehicle 10.

In this example, the burden grades of zero to ten values can be examples of predetermined information that is pre-stored in the non-transitory computer readable medium MEM. When the processor 20 assigns a burden grade to a situation, that grade can be compared to the burden grades that are already prestored. If the assigned grades exceed a predetermined threshold, such as five or above, then the processor 20 can control the display device 18 to modify the notification or alerts as necessary. That is, the processor 20 is programmed to control the electronic display to increase the intensity of notification data that is displayed upon determining that a predetermined driver burden threshold has been met because information received from the on-board sensor network 12.

The processor 20 can also assign these factors a grade by also taking into account information detected by the NAV and the environmental sensors 16. For example, the processor 20 can heighten the grade when determining that the driver is distracted and also subject to an upcoming lane change decision. Therefore, the processor 20 can control the display device 18 to display alerts, warnings or lane change recommendations farther ahead in time of the encounter. In another example, the processor 20 can determine that the vehicle 10 is on a navigation path that will soon require a succession of lane changes in a relatively short period of time or through a short distance. Such a situation can be stressful to the driver, especially during high speed travel or high congestion. The processor 20 can control the display device 18 to display alerts, warnings, and lane change recommendations far ahead of the encounter so that the driver will anticipate the maneuver.

Figure 10:
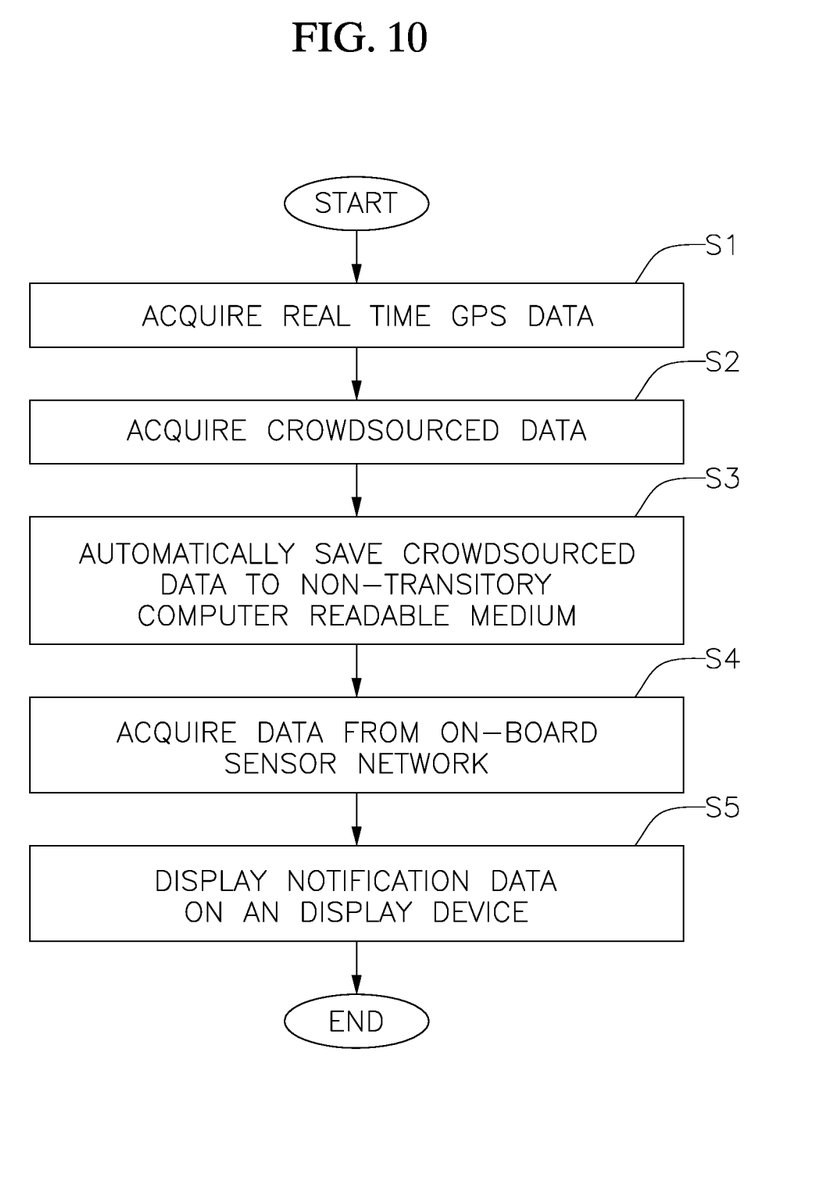
FIG. 10 is a flowchart of a method that can be executed by a processor of the notification system.

Referring now to FIG. 10, a method for displaying notification data to a driver of a vehicle 10 is illustrated. The method can be carried out by the processor 20. In step S1, the method comprises acquiring real-time information regarding conditions near the vehicle's 10 vicinity from the on-board satellite navigation device NAV. That is, the method comprises acquiring GPS data. In step S2, the method further comprises acquiring crowdsourced information regarding conditions near the vehicle's 10 vicinity from the TCU. Therefore, the method further comprises acquiring information from the cloud server or the vehicle network.

In step S3, the method further comprises automatically saving the crowdsourced information to the non-transitory computer readable medium MEM. In step S4, the method further comprises acquiring predetermined information regarding conditions near the vehicle's 10 vicinity from the non-transitory computer readable medium MEM. In step S5, the method further comprises acquiring conditions regarding the passenger compartment of the vehicle 10 from the on-board sensor network 12. In step S6, the processor 20 can determine a burden condition of the driver and/or the passengers based on information acquired by the on-board sensor network 12. In step S7, the method further comprises controlling the electronic display to display notification data regarding the vehicle's 10 vicinity based on one or more of the real-time information, the crowdsourced information and the predetermined information.

While the illustrated embodiment is shown as the notification as providing notification on the display device 18 having a display screen, it will be apparent to those skilled in the vehicle 10 field from this disclosure that the notification system 22 can be applied as a haptic alert system. For example, the notification system 22 can send notification data via seat vibration, wheel vibration or accelerator pedal vibration if the processor 20 determines that a haptic alert is necessary to get the driver's attention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the vehicle notification system. Accordingly, these terms, as utilized to describe the present invention should be interpreted relative to a vehicle equipped with the vehicle notification system.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle comprising:
an on-board satellite navigation device in communication with a global positioning system unit to acquire real-time information regarding conditions near the vehicle's vicinity;
a telematics control unit in wireless communications to at least one of a cloud services and a vehicle network to upload and receive crowdsourced information regarding conditions near the vehicle's vicinity;
a non-transitory computer readable medium storing predetermined information including predetermined burden grades regarding conditions near the vehicle vicinity;
an electronic display device positioned an interior compartment of the vehicle; and
a processor programmed to assign a burden grade to a situation detected by one or more of the on-board satellite navigation device and telematics control unit, to compare the assigned burden grade to the predetermined burden grades and to control the electronic display device to display notification data regarding the vehicle vicinity based on the predetermined information and one or more of the real-time information and the crowdsourced information, the burden grade being related to a burden state of a driver based on at least one internal sensor of the vehicle.

2. The vehicle according to claim 1, wherein
the processor is programmed to anticipate information regarding upcoming conditions near the vehicle vicinity based on one or more of the real-time information received from the on-board satellite navigation device, the crowdsourced information and the predetermined information.

3. The vehicle according to claim 2, wherein
the processor is programmed to control the electronic display device to provide notification data that includes upcoming conditions near the vehicle vicinity that is anticipated by the processor.

4. The vehicle according to claim 3, wherein
the upcoming conditions include at least one of a vehicle stopping event, a vehicle deceleration event, a vehicle acceleration event, and a lane change event.

5. The vehicle according to claim 4, wherein
the upcoming conditions further includes a series of events occurring in succession that includes at least the vehicle stopping event, the vehicle deceleration event and the lane change event.

6. The vehicle according to claim 1, wherein
the notification data displayed by the electronic display device includes upcoming occlusions in which visibility is poor.

7. The vehicle according to claim 1, wherein
the processor is programmed to calculate geometric arrangements of road conditions based on one or more of the real-time information, the crowdsourced information and the predetermined information.

8. The vehicle according to claim 1, further comprises
an on-board sensor network that monitors conditions regarding the passenger compartment of the vehicle.

9. The vehicle according to claim 8, wherein
the processor controls the electronic display device to increase the intensity of notification data that is displayed based on the conditions regarding the passenger compartment of the vehicle.

10. The vehicle according to claim 9, wherein
the on-board sensor network includes at least one internal camera positioned to detect behavior of one or more passengers in the passenger compartment.

11. The vehicle according to claim 10, wherein
the on-board sensor network includes at least one internal microphone positioned to detect behavior of one or more passengers in the passenger compartment.

12. The vehicle according to claim 11, wherein
the processor is programmed to determine a burden condition of the vehicle's driver based on information received from the on-board sensor network.

13. The vehicle according to claim 12, wherein
the processor is programmed to control the electronic display to increase the intensity of notification data that is displayed upon determining that a predetermined driver burden threshold has been met because information received from the on-board sensor network.

14. A method for displaying notification data to a driver of a vehicle, the method comprising:
acquiring real-time information regarding conditions near the vehicle's vicinity from an on-board satellite navigation device in communication with a global positioning system unit;
acquiring crowdsourced information regarding conditions near the vehicle's vicinity from a telematics control unit in wireless communications with at least one of a cloud services and a vehicle network;
acquiring predetermined information including predetermined burden grades regarding conditions near the vehicle vicinity from a non-transitory computer readable medium;
assigning a burden grade to a situation detected by one or more of the on-board satellite navigation device and telematics control unit, the burden grade being related to a burden state of a driver based on at least one internal sensor of the vehicle;
comparing the assigned burden grade to the predetermined burden grades; and
controlling a vehicle on-board electronic display to provide notification data regarding the vehicle vicinity based on the predetermined information and one or more of the real-time information and the crowdsourced information.

15. The method according to claim 14, further comprising acquiring conditions regarding a passenger compartment of the vehicle from an on-board sensor network.

16. A vehicle notification system comprising:
an electronic display device configured to be provided in an interior compartment of the vehicle;
an electronic control unit having a processor and a non-transitory computer readable medium storing predetermined information including predetermined burden grades regarding conditions near the vehicle vicinity, the burden grades being related to a burden state of a driver based on at least one internal sensor of the vehicle, the processor being programmed
to assign a burden grade to a situation,
to compare the assigned burden grade to the predetermined burden grades, and
to control the electronic display device to display notification data regarding the vehicle vicinity based on the predetermined information that is stored in the non-transitory computer readable medium.

17. The vehicle notification system according to claim 16, further comprising
a vehicle having
an on-board satellite navigation device in communication with a global positioning system unit to acquire real-time information regarding conditions near the vehicle's vicinity, and
a telematics control unit in wireless communications to at least one of a cloud services and a vehicle network to upload and receive crowdsourced information regarding conditions near the vehicle's vicinity.

18. The vehicle notification system according to claim 17, wherein
the processor is programmed to automatically download information from the cloud services and the vehicle network to be stored in the non-transitory computer readable medium.

* * * * *